UNITED STATES PATENT OFFICE.

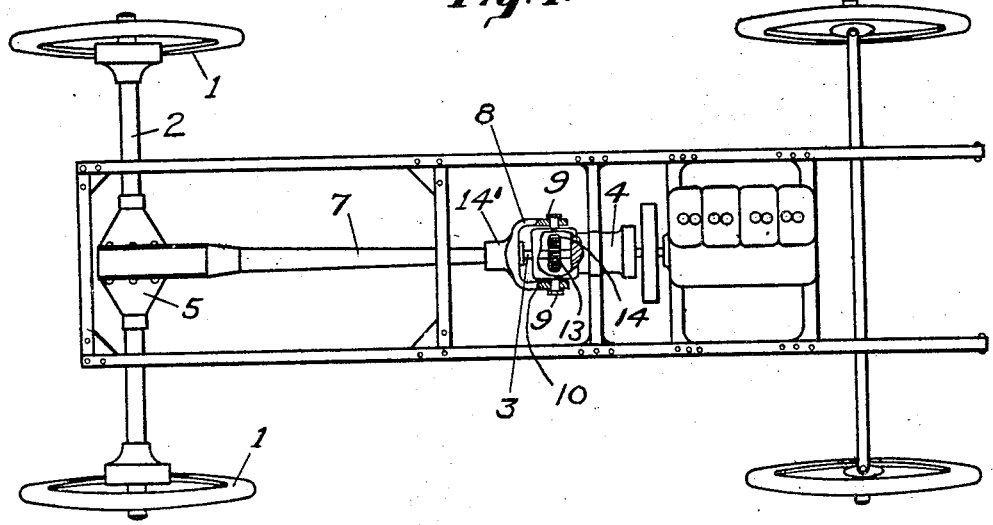
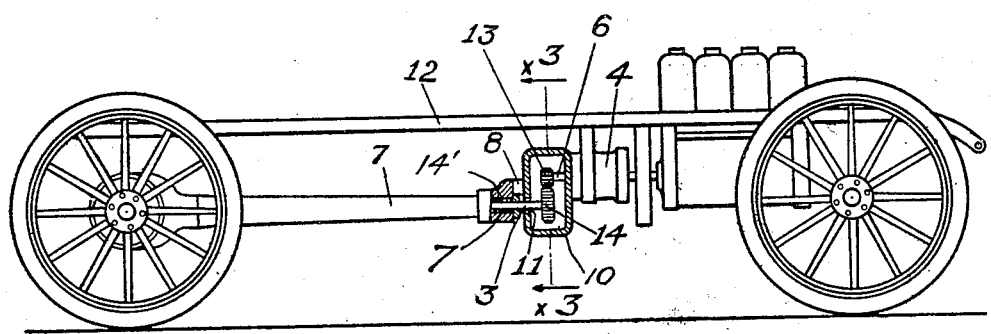
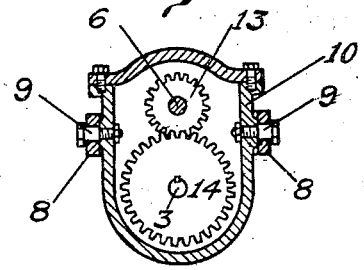

JAMES R. RICKETTS, OF LOS ANGELES, CALIFORNIA.

TRANSMISSION-GEARING.

1,057,775.  Specification of Letters Patent.  Patented Apr. 1, 1913.

Application filed April 1, 1912.  Serial No. 687,869.

*To all whom it may concern:*

Be it known that I, JAMES R. RICKETTS, a citizen of the United States, residing at Los Angeles, in the county of Los Angeles and State of California, have invented a new and useful Transmission-Gearing, of which the following is a specification.

The object of the present invention is to eliminate the universal joint which is employed in the propelling shaft of an automobile extending from the case containing the transmission gears to the rear axle and to thereby conserve a considerable amount of power which the universal joint now absorbs, thus delivering a greater amount of power to the rear driving axle.

Referring to the drawings: Figure 1 is a plan view of the framework and wheels of an automobile equipped with the invention, part of the housing for the invention being broken away. Fig. 2 is a side elevation with part of the housing for the invention being broken away. Fig. 3 is an enlarged section on line $x^3$—$x^3$ Fig. 2.

1 designates the rear wheels.

2 designates the rear axle and 3 the propelling shaft which extends from the transmission gear case 4 to the differential gear case 5 on the rear axle 2. The rear axle 2 has a vertical movement with respect to the transmission gear case 4 in the operation of the automobile, and the present invention forms the driving connection between the propelling shaft 3 and the driving shaft 6 which extends from the transmission gear case 4. The propelling shaft 3 is mounted to rotate in a tubular housing 7 which is rigidly connected with the differential gear case 5 and extends forward toward the transmission gear case 4, and is provided with a fork 8 on the front end, the fork being pivoted on pins 9 which are secured to a gear box 10 which houses the flexible driving connection between shafts 6 and 3. The gear box 10 has an opening 11 through which the shaft 3 passes, the opening 11 being sufficiently large to permit the swinging movement of shaft 3. The gear box 10 is rigidly mounted and connected with the frame 12 of the automobile.

Rigidly mounted on the shaft 6 is a pinion 13 which meshes with a gear 14 on the propelling shaft 3 and the intersection of the pitch lines of the teeth of the pinion 13 and gear 14 are on a line which extends through the center of the pivot pins 9, so that as the shaft 3 swings in unison with the tubing 7 the pivotal point of which is the center of movement of propelling shaft 3, is at the center of the gear teeth which are in mesh and concentric with the pins 9, so that the least possible sliding movement occurs between the teeth 13 and gear 14. In order to permit of this slight rocking movement between the pinion and gear, the corners of the gear teeth are slightly rounded, as shown in Fig. 2. The pinion and gear within the gear box 10 are lubricated by oil which may be carried in the box 10.

In order to permit the necessary rotative motion of the tube 7 with respect to the gear box 4, when traveling over an uneven road, and when the wheels 1 do not rest on the same level, I provide a hub 14' on the forks 8, and the front end of the tube 7 is journaled in the hub 14'.

What I claim is:

1. In combination, a gear box, a shaft extending thereinto, a pinion on said shaft, a tubular shaft housing member with a forked end pivoted on said gear box, a shaft in said tubular housing, a gear on said shaft within said gear box meshing with said pinion, the pivotal axis of said fork being on a line which intersects the pitch lines of the gear and pinion, and midway of the width of the teeth.

2. In combination, a gear box, a shaft extending thereinto, a pinion on said shaft, a tubular shaft housing member, a fork pivoted to the gear box, the end of said tubular member being journaled in said fork, a propelling shaft extending through said tubular housing into said gear box, and a gear on said shaft meshing with said pinion.

In testimony whereof, I have hereunto set my hand at Los Angeles, California, this 23d day of March, 1912.

JAMES R. RICKETTS.

In presence of—
G. T. HACKLEY,
MARTHA LANGE.